(No Model.)
J. LENHART.
PLOW.
No. 415,542. Patented Nov. 19, 1889.
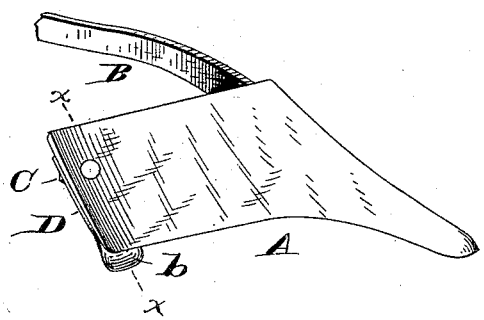
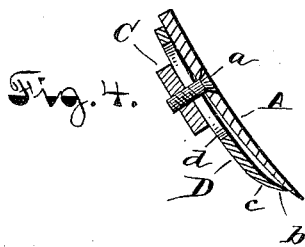 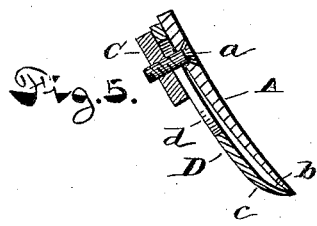
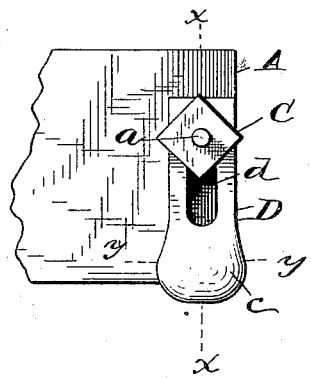 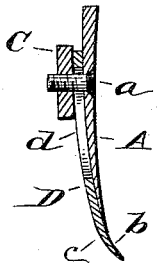
Witnesses
H. D. Nealy
L. S. Bacon
Inventor
John Lenhart
By his Attorney
M. D. Peck

UNITED STATES PATENT OFFICE.

JOHN LENHART, OF FREMONT, IOWA.

PLOW.

SPECIFICATION forming part of Letters Patent No. 415,542, dated November 19, 1889.

Application filed June 6, 1889. Serial No. 313,317. (No model.)

*To all whom it may concern:*

Be it known that I, JOHN LENHART, a citizen of the United States, residing at Fremont, in the county of Hamilton and State of Iowa, have invented certain new and useful Improvements in Plows; and I do hereby declare the following to be a full, clear, and exact description of the invention, such as will enable others skilled in the art to which it appertains to make and use the same, reference being had to the accompanying drawings, which form part of this specification.

My invention relates to an improvement in attachments for the mold-board or share of plows, and has for its object to provide an adjustable bearing for holding the plow level and keeping it from tilting over to the mold-board side, which will correct its heaving tendency, and thereby lighten the draft and make it easy to control.

A further object of the attachment is to preserve the extreme outer or projecting edge of the plowshare from wearing off and rendering the share useless while its other portions are in comparatively a good condition; and the invention consists in the construction hereinafter described, and more particularly pointed out in the claims.

Referring to the drawings, Figure 1 is a perspective view of a plowshare having my invention applied thereto. Fig. 2 is a rear detail view showing my curved adjustable slide-plate or runner secured to the inner side of the share. Fig. 3 is a longitudinal sectional view through the share and slide-plate on the lines $x$ $x$ of Figs. 1 and 2. Figs. 4 and 5 are like views showing the plate adjusted in different positions. Fig. 6 is a cross-section on the line $y$ $y$ of Fig. 2 of the slide-plate, showing its front and rear edges.

Like letters of reference refer to corresponding parts in each figure of the drawings.

A represents a plowshare of the ordinary construction, having the landside B thereon, which is made to extend back at some distance in the rear of the share. Near the rear edge of the share and at a point above its vertical center there is a bolt $a$ passed through the share from the outer side, having its head sunken in the body of the share and made integral therewith. The shank of this bolt extends some distance on the inner side of the share, and has its inner end screw-threaded to receive a nut C.

An adjustable slide-plate D is formed, preferably of steel, though it may be of other hardened metal, having a longitudinal slot $d$ therein extending about two-thirds its length from near its upper end, which is placed over the inner end of the bolt $a$ and held thereon and against the plowshare by the nut C. The front face $b$ of the adjustable plate D is curved downward and outward to conform to the inner contour of the share. The rear or inner face $c$ of the lower portion of the plate is curved forward and to the front and rear from its central point, and has its edges beveled down to lie flat upon the inner face of the share, that it may slide freely over the dirt as the plow is drawn within the soil.

From the construction of the adjustable plate D it will be observed that it is made to form a gradual taper from its lower sharp edge upward to the slot $d$, and has its lower portion bent or turned outward. When the plate is adjusted upward on the bolt $a$ to the extent of the slot, as shown in Fig. 4, its edge is drawn away from the edge of the share a sufficient distance, so that the share is not affected by it; but when let down so that the edges of the plate and share register one with the other or the edge of the plate is adjusted beyond the edge of the share the side of the share is raised and tilted over to the land side by adjustment to the extent desired, depending upon the character of soil, and renders the draft much more easy than without it.

From the position of the adjustable plate when in use under the rear lower projecting edge of the share, it preserves the share at this point, where it wears out most quickly, until its other portions less exposed are worn equally, until finally it is necessary to supply its place with a new one.

The lower edge of the adjustable plate D, as it projects outward from under the edge of the share, is also found to be especially useful where the plow is used in a thick turf having deep matted grass or other small roots. In this character of soil the sharp cutting-edge of the plate runs underneath the sod and through the roots not cut by the share to the exposed edge of the sod, enabling it to be easily rolled over instead of being twisted upon itself until the roots are broken, as heretofore, when the edge of the share is not run near enough to the exposed edge of the sod to cut through the roots, and enables the plowman to perform much better work.

I do not confine my invention to the particular form of the lower portion of my adjustable plate, as this may be made of any desired construction, so that it will adjust the required degree of elevation of the side of the share and protect it from wear and furnish a cutting adjustable edge projecting beyond the share.

Having thus fully described my invention, what I claim as new, and desire to secure by Letters Patent of the United States, is—

1. The combination, with a plow, of an adjustable plate working under the edge of the share to raise or lower the share to keep the plow level and from tilting over and the share from wear, as and for the purpose set forth.

2. The combination, with a plow, of an adjustable slide-plate secured to the inner side of the share by a bolt, said plate conforming to the contour of the share, and adapted for adjustment under its edge to raise or lower the share to keep the plow level and from tilting over and the share from wear, as and for the purpose set forth.

3. The combination, with a plow having a bolt through the share and a nut thereon, of a slotted slide-plate secured by the bolt and nut to the inner side of the share, the outer side of said plate conforming to the inner contour of the share, and its inner lower portion beveled to an edge, front and back, and to its lower extremity from its rear central point, said slide being adapted for adjustment under the edge and beyond the share or back from the edge, as and for the purpose set forth.

In testimony whereof I affix my signature in presence of two witnesses.

JOHN LENHART.

Witnesses:
A. N. BOEYL,
AUGUST SANDAL.